(12) United States Patent
Oikawa et al.

(10) Patent No.: US 9,366,925 B2
(45) Date of Patent: Jun. 14, 2016

(54) ELECTRO-OPTICAL APPARATUS, AND ELECTRONIC APPARATUS

(75) Inventors: Hiroyuki Oikawa, Chitose (JP); Satoshi Ito, Eniwa (JP)

(73) Assignee: Seiko Epson Corporation, Tokyo (JP)

( * ) Notice: Subject to any disclaimer, the term of this patent is extended or adjusted under 35 U.S.C. 154(b) by 407 days.

(21) Appl. No.: 13/614,100

(22) Filed: Sep. 13, 2012

(65) Prior Publication Data
US 2013/0077003 A1   Mar. 28, 2013

(30) Foreign Application Priority Data

Sep. 28, 2011   (JP) ................................. 2011-212183

(51) Int. Cl.
*G02F 1/1368* (2006.01)
*G02F 1/1362* (2006.01)

(52) U.S. Cl.
CPC ................. *G02F 1/136213* (2013.01)

(58) Field of Classification Search
None
See application file for complete search history.

(56) References Cited

U.S. PATENT DOCUMENTS

| 6,433,841 B1 | 8/2002 | Murade et al. |
| 6,683,592 B1 * | 1/2004 | Murade ........................ 349/107 |
| 2002/0145683 A1 | 10/2002 | Murade et al. |
| 2003/0184705 A1 | 10/2003 | Murade et al. |
| 2004/0114088 A1 | 6/2004 | Murade |
| 2005/0007356 A1 * | 1/2005 | Eguchi .......................... 345/204 |
| 2007/0087534 A1 | 4/2007 | Yasukawa |
| 2010/0118220 A1 * | 5/2010 | Jang et al. ...................... 349/39 |

FOREIGN PATENT DOCUMENTS

| JP | 11-218781 A | 8/1999 |
| JP | 2000-194008 A | 7/2000 |
| JP | 2004-234032 A | 8/2004 |
| JP | 2004-364509 A | 12/2004 |
| JP | 2005-164822 A | 6/2005 |
| JP | 2007-3903 A | 1/2007 |
| JP | 2007-57846 A | 3/2007 |
| JP | 2007-102054 A | 4/2007 |

* cited by examiner

*Primary Examiner* — Ryan Crockett
(74) *Attorney, Agent, or Firm* — ALG Intellectual Property, LLC

(57) ABSTRACT

Provided is an electro-optical apparatus that includes a first insulation layer, a retention capacitance region including a plurality of retention capacitances disposed on the first insulation layer, a second insulation layer formed so as to cover the first insulation layer and the plurality of retention capacitances, and a plurality of pixel electrodes arranged on the second insulation layer so as to respectively overlap a corresponding one of the plurality of retention capacitances in a plan view. The first insulation layer includes a recessed portion formed in a region including the retention capacitance region, and the retention capacitances are provided on a bottom face of the recessed portion.

12 Claims, 9 Drawing Sheets

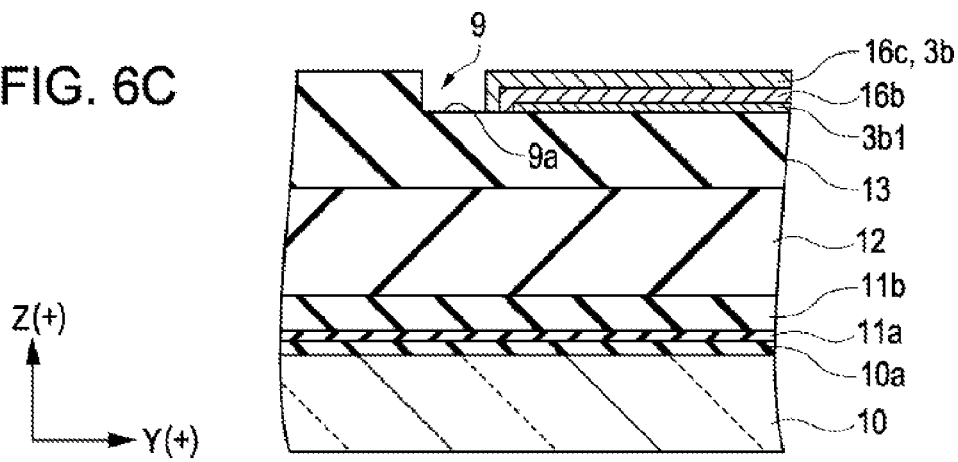
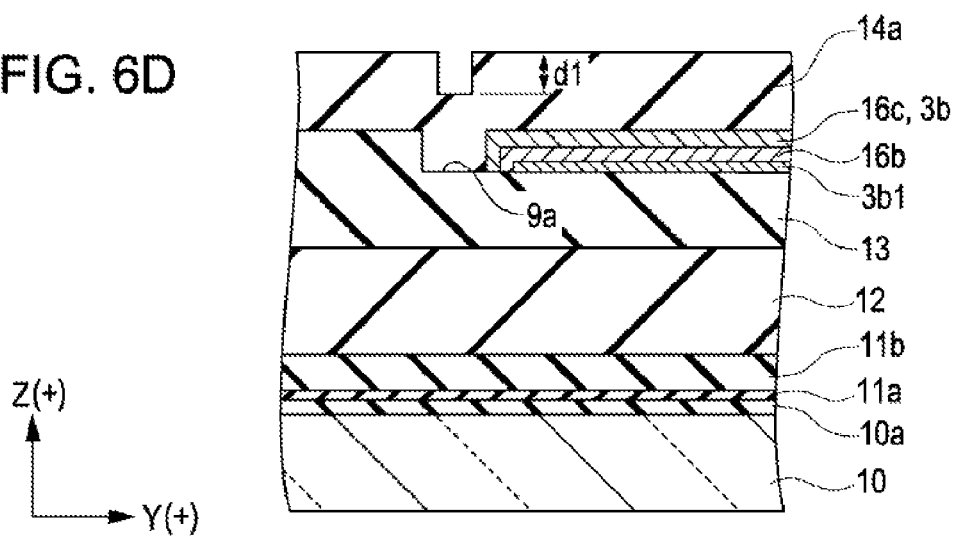
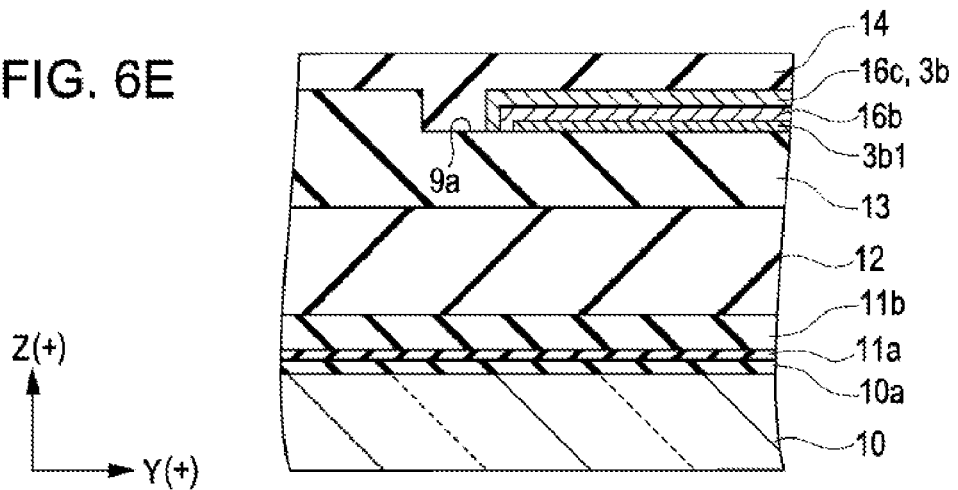

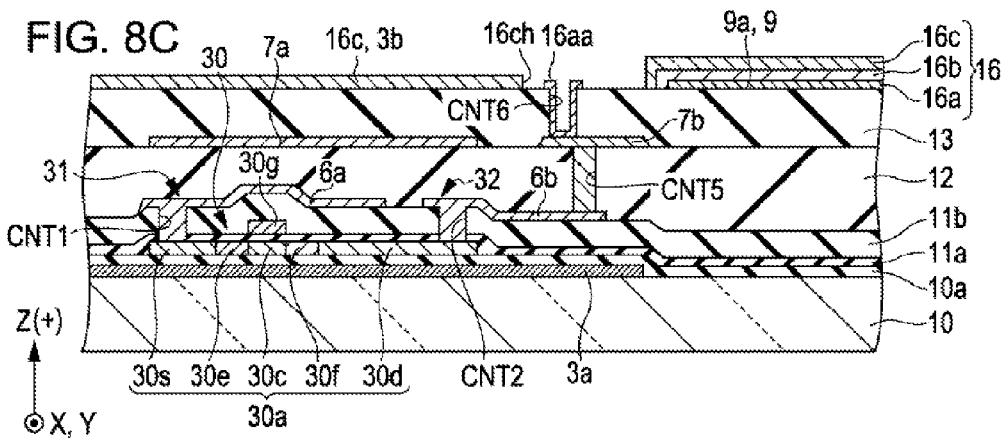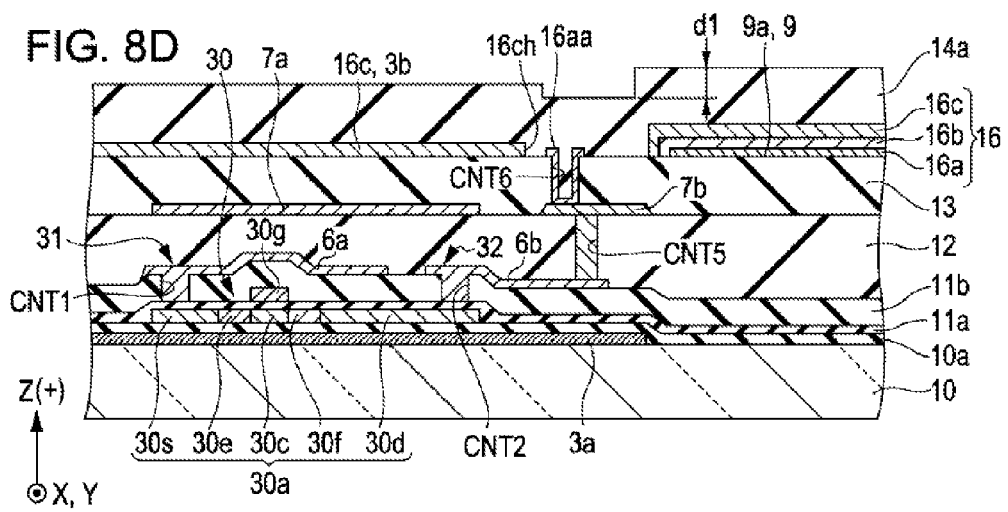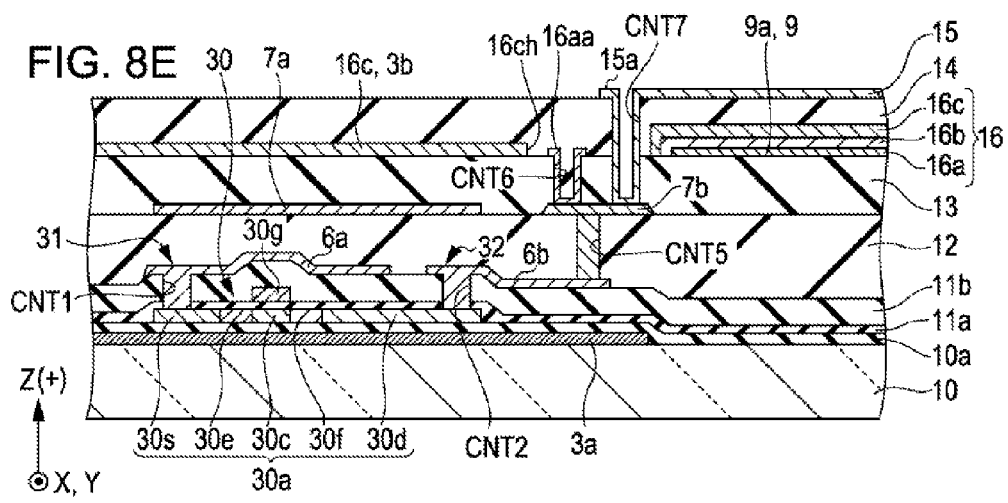

ELECTRO-OPTICAL APPARATUS, AND ELECTRONIC APPARATUS

BACKGROUND

1. Technical Field

The present invention relates to an electro-optical apparatus and a manufacturing method thereof, and to an electronic apparatus that includes the electro-optical apparatus.

2. Related Art

An example of the captioned electro-optical apparatus is an actively driven liquid crystal device employed as an optical modulator of a liquid crystal projector. The liquid crystal device has a pixel region including pixel electrodes arranged in a matrix pattern, thin film transistors (hereinafter, TFT) that perform switching control of the pixel electrodes, and a retention capacitance for retaining image signals written in the pixel electrodes, and a peripheral region including a scanning line driver circuit and a data line driver circuit for actively driving the pixel region.

It is desirable that such a liquid crystal device display brighter images with higher contrast, and therefore it is necessary to minimize factors that shield light in the pixel region, and to increase the retention capacitance to thereby improve the potential retention characteristic of the pixel electrodes. Accordingly, for example JP-A-2007-3903 proposes forming a transparent retention capacitance by employing a light-transmissive electrode constituted of indium tin oxide (ITO), so that the opening region of the pixel electrode is not optically blocked despite increasing the size of the retention capacitance.

In the liquid crystal device according to JP-A-2007-3903, however, a global step is formed along the outer periphery of the region where the retention capacitance is provided (hereinafter referred to as retention capacitance region), which disturbs the alignment of the liquid crystal molecules thus making the display uneven. This aspect will be described in further details here below.

According to JP-A-2007-3903, an interlayer dielectric is formed so as to cover the transparent retention capacitance, and the transparent pixel electrode is formed on the interlayer dielectric after a chemical mechanical polishing (hereinafter, CMP) process is applied to the interlayer dielectric for planarization. In the thus-configured liquid crystal device, light is reflected at an interface between materials having different refractive indices, such as the interface between the pixel electrode and the interlayer dielectric, and the interface between the retention capacitance and the interlayer dielectric. Such reflected light provokes multiple interference, by which the intensity of the light transmitted through the interlayer dielectric is changed depending on the film thickness of the interlayer dielectric. Accordingly, the ununiform film thickness of the interlayer dielectric provokes fluctuation in spectral transmittance and color tone of the image displayed thereby degrading the display quality. Therefore, it is necessary to form the interlayer dielectric under control in a desired film thickness.

Besides, since the polish-away amount in the CMP process is mechanically controlled, in the case where a large polish-away amount is set to form the interlayer dielectric it is difficult to adjust the film thickness to the desired level because of increased mechanical fluctuation. Accordingly, the polish-away amount has to be set as small as possible when forming the interlayer dielectric.

On the other hand, reducing the polish-away amount in the CMP process makes it difficult to completely remove projections and recesses on the surface of the interlayer dielectric reflecting the shape of the retention capacitance, in other words projections widely formed in the retention capacitance region, and the global gap is formed along the outer periphery of the retention capacitance region. The alignment of the liquid crystal molecules is disturbed in the vicinity of the global step, and consequently the display becomes uneven.

SUMMARY

A first application example of the invention represents an electro-optical apparatus that includes a first insulation layer, a retention capacitance region including a plurality of retention capacitances disposed on the first insulation layer, a second insulation layer formed so as to cover the first insulation layer and the plurality of retention capacitances, and a plurality of pixel electrodes arranged on the second insulation layer so as to respectively overlap a corresponding one of the plurality of retention capacitances in a plan view. The first insulation layer includes a recessed portion formed in a region including the retention capacitance region, and the retention capacitances are provided on a bottom face of the recessed portion.

In the electro-optical apparatus according to the first application example, the retention capacitances are formed on the bottom face of the recessed portion formed on the first insulation layer. Accordingly, the widely formed projections reflecting the uneven shape of the underlying retention capacitances, which are the cause of the global step, become lower in the second insulation layer formed over the first insulation layer and the retention capacitances. Such low-profile projections formed over a wide region can be removed by the CMP process of a small polish-away amount, so that the second insulation layer is formed with a flat surface free from the global step. Further, since the film thickness is only slightly reduced by the CMP process, the second insulation layer can be accurately formed in a desired film thickness.

The foregoing configuration suppresses, therefore, disturbance to the alignment of the liquid crystal molecules by the global step and uneven display originating from the ununiform film thickness of the second insulation layer, and thus an electro-optical apparatus that provides a high-quality display can be obtained.

APPLICATION EXAMPLE 2

In the foregoing electro-optical apparatus, it is preferable that the depth of the recessed portion and the thickness of the retention capacitance formed on the bottom face of the recessed portion are generally the same.

When the depth of the recessed portion and the thickness of the retention capacitance is generally the same, the surface of the first insulation layer in the periphery of the recessed portion and the surface of the retention capacitance formed on the bottom face of the recessed portion become generally flush with each other. Accordingly, although the retention capacitance is formed on the first insulation layer, the surface is barely elevated by the retention capacitance region. Such a configuration further lowers the widely formed projections reflecting the uneven shape of the underlying retention capacitances, which are the cause of the global step, in the second insulation layer formed over the first insulation layer and the retention capacitances.

APPLICATION EXAMPLE 3

In the foregoing electro-optical apparatus, it is preferable that the retention capacitances each include a first retention capacitance electrode electrically connected to the pixel electrode, a second retention capacitance electrode formed so as to span over a plurality of pixel electrodes and to which a common potential is supplied, and a dielectric layer interposed between the first retention capacitance electrode and the second retention capacitance electrode.

In the electro-optical apparatus thus configured, since the retention capacitance includes the first retention capacitance electrode electrically connected to the pixel electrode, the second retention capacitance electrode formed so as to span over the plurality of pixel electrodes and to which a common potential is supplied, and the dielectric layer interposed between the first retention capacitance electrode and the second retention capacitance electrode, image signals provided to the pixel electrode are prevented from leaking and therefore a high-quality display can be achieved.

APPLICATION EXAMPLE 4

A fourth application example represents the electro-optical apparatus according to the third application example, in which the recessed portion includes a protruding portion formed on the bottom face thereof, in at least one of a region where the first retention capacitance electrode is not located and a region where the second retention capacitance electrode is not located.

In the electro-optical apparatus according to the fourth application example, the depth of the recessed portion in the region where the first retention capacitance electrode is not located, or in the region where the second retention capacitance electrode is not located, is reduced to the extend corresponding to the height of the protruding portion formed on the bottom face. Accordingly, the unevenness of the surface of the second insulation layer formed over the retention capacitance electrode thus configured is further leveled off. Upon applying the planarization process to the second insulation layer, therefore, the surface thereof can be further flattened.

APPLICATION EXAMPLE 5

In the foregoing electro-optical apparatus, it is preferable that the retention capacitance and the pixel electrode are formed of a light-transmissive material.

In the electro-optical apparatus thus configured, the second insulation layer formed between the retention capacitance and the pixel electrode, both of which are light-transmissive, is flat and has a generally uniform film thickness. Therefore, multiple interference of the transmitted light originating from the ununiform film thickness of the second insulation layer is suppressed, and high-level light transmittance can be achieved in the pixels with the pixel electrode. In addition, the retention capacitance suppresses leakage of the image signals provided to the pixel electrode.

Consequently, a transmissive liquid crystal device that provides a bright and high-quality display can be obtained.

APPLICATION EXAMPLE 6

In the foregoing electro-optical apparatus, it is preferable that the pixel electrode is formed of a light-reflective material.

In the electro-optical apparatus thus configured, since the light-reflective pixel electrode is provided on the second insulation layer which is flat and has a uniform film thickness, the light reflected by the pixel electrode is kept from diffusing and therefore a high reflection characteristic can be achieved. In addition, the retention capacitance suppresses leakage of the image signals provided to the pixel electrode.

Consequently, a reflective liquid crystal device that provides a bright and high-quality display can be obtained.

APPLICATION EXAMPLE 7

A seventh application example represents an electronic apparatus that includes the electro-optical apparatus according to the foregoing application examples.

The seventh application example includes, because of including the electro-optical apparatus according to the foregoing application examples, various electronic apparatuses having a high-quality display function, such as a projector, a rear-projection TV, a direct-view TV, a mobile phone, a portable audio apparatus, a personal computer, a video camera monitor, a car navigation system, a pager, an electronic organizer, a pocket calculator, a word processor, a work station, a TV phone, a POS terminal, a digital still camera, and so forth.

APPLICATION EXAMPLE 8

An eighth application example represents a method of manufacturing an electro-optical apparatus that includes pixels each provided with a retention capacitance and a pixel electrode. The method includes forming a recessed portion in a first insulation layer, forming a plurality of retention capacitances on a bottom face of the recessed portion, forming a second insulation layer so as to cover the first insulation layer and the plurality of retention capacitances, planarizing the second insulation layer, and forming a plurality of pixel electrodes on the second insulation layer such that each of the pixel electrodes overlaps a corresponding one of the plurality of retention capacitances in a plan view.

By the method according to the eighth application example, the recessed portion is formed on the first insulation layer and the retention capacitances are formed on the bottom face of the recessed portion. Accordingly, the widely formed projections reflecting the uneven shape of the underlying retention capacitances, which are the cause of the global step, become lower in the second insulation layer formed over the first insulation layer and the retention capacitances. Such low-profile projections formed over a wide region can be removed by the CMP process of a small polish-away amount, so that the second insulation layer is formed with a flat surface free from the global step. Further, since the film thickness is only slightly reduced by the CMP process, the second insulation layer can be accurately formed in a desired film thickness.

The foregoing method suppresses, therefore, disturbance to the alignment of the liquid crystal molecules by the global step and uneven display originating from the ununiform film thickness of the second insulation layer, and thus an electro-optical apparatus that provides a high-quality display can be obtained.

APPLICATION EXAMPLE 9

In the method according to the foregoing application example, it is preferable that the forming the recessed portion on the first insulation layer includes employing an anisotropic dry etching process.

By the method thus arranged, the recessed portion having a flat bottom face can be formed by the anisotropic dry etching process. The retention capacitance and the second insulation layer formed on the flat bottom face of the recessed portion each constitute a flat film having a generally uniform film thickness. Further, because of the flat shape of the bottom face of the recessed portion, the second insulation layer formed thereon also has a generally flat surface, and therefore the planarization can be achieved only with a small polish-away amount. In addition, since the film thickness is barely reduced by the CMP process, the second insulation layer can be formed in a desired film thickness with increased accuracy.

APPLICATION EXAMPLE 10

In the method according to the foregoing application example, it is preferable that the planarizing the second insulation layer includes polishing and, after the polishing, etching the polished surface.

By the method thus arranged, minute scratches incurred in the polishing process can be removed by the etching. Further, ununiformity of the polish-away amount in the polishing process can be readjusted in the etching of the polished surface, which allows the second insulation layer to be formed in a desired film thickness with increased accuracy.

BRIEF DESCRIPTION OF THE DRAWINGS

The invention will be described with reference to the accompanying drawings, wherein like numbers reference like elements.

FIGS. 6C to 6E are schematic cross-sectional views for explaining the manufacturing method of the portion indicated by VI in FIG. 2.

FIGS. 8C to 8E are schematic cross-sectional views taken along a line VIII-VIII in FIG. 3A, for explaining the manufacturing method of the pixel region.

DESCRIPTION OF EXEMPLARY EMBODIMENTS

Figure 1A:
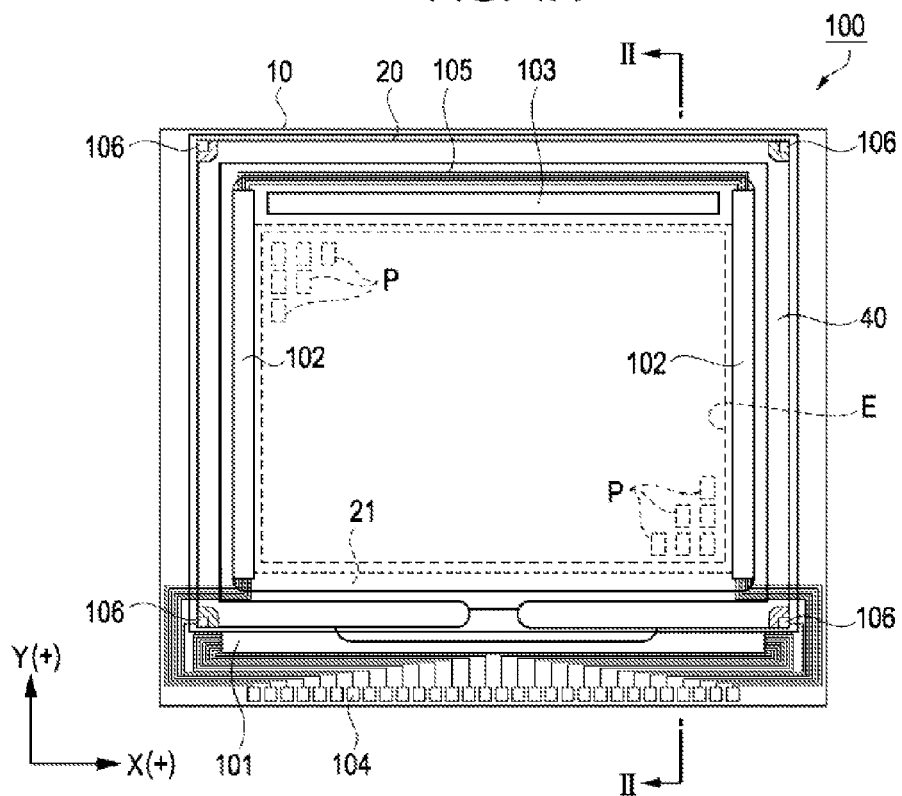
FIG. 1A is a schematic plan view showing a configuration of a liquid crystal device.

Hereafter, an embodiment of the invention will be described referring to the drawings. In the drawings, the constituents may be illustrated in scales different from the actual ones, for the sake of better visual understanding.

Embodiment

Outline of Liquid Crystal Device

Figure 1B:
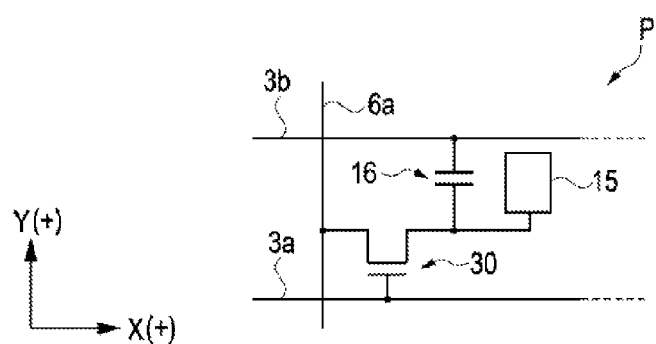
FIG. 1B is an equivalent circuit diagram representing a configuration of a pixel.
Figure 2:
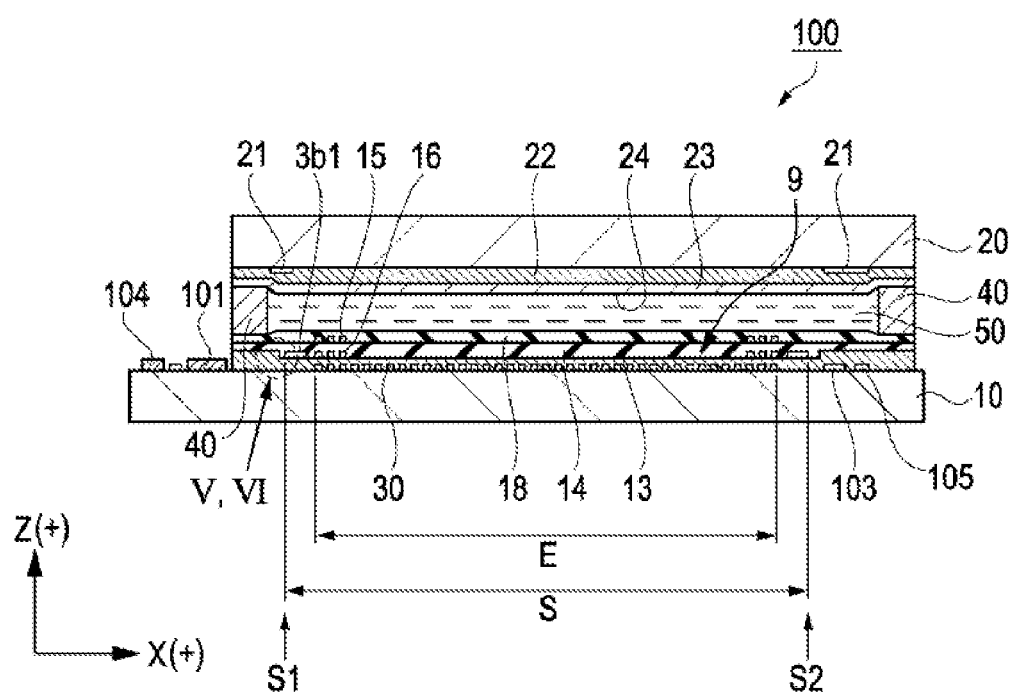
FIG. 2 is a schematic cross-sectional view taken along a line II-II in FIG. 1A.

Referring first to FIGS. 1A, 1B, and 2, a liquid crystal device according to the embodiment, exemplifying the electro-optical apparatus, will be generally described. FIG. 1A is a schematic plan view showing a configuration of the liquid crystal device, and FIG. 1B is an equivalent circuit diagram of a pixel. FIG. 2 is a schematic cross-sectional view of the liquid crystal device, taken along a line II-II in FIG. 1A.

As shown in FIGS. 1A and 2, the liquid crystal device 100 according to this embodiment includes a pair of substrates, namely an element substrate 10 and a counter substrate 20 disposed so as to oppose each other, and a liquid crystal layer 50 interposed between the pair of substrates. The element substrate 10 and the counter substrate 20 are formed of a transparent material such as quartz or glass.

The element substrate 10 is larger than the counter substrate 20 both in length and width, and these substrates are joined together via a seal member 40 arranged in a frame shape, with liquid crystal having negative dielectric anisotropy enclosed therebetween so as to constitute a liquid crystal layer 50. The seal member 40 may be, for example, an adhesive composed of a thermosetting or UV-curable epoxy resin. The seal member 40 may contain a spacer (not shown) for maintaining the gap between the pair of substrates constant.

A light shield layer 21, also having a frame shape, is provided inside the frame-shaped seal member 40. The light shield layer 21, for example formed of a light-shielding metal or an oxide thereof, defines a pixel region E thereinside. A plurality of pixels P are arranged in a matrix pattern in the pixel region E. The pixel region E may include a plurality of dummy pixels disposed so as to surround the pixels P which are positively involved in creating the display. Although not shown in FIGS. 1A and 1B, light shield materials are also disposed in the pixel region E so as to surround each of the pixels P in a plan view.

On the counter substrate 20, the light shield layer 21, an interlayer dielectric 22 formed so as to cover the light shield layer 21, a counter electrode 23 formed so as to cover the interlayer dielectric 22, and an alignment layer 24 covering the counter electrode 23 are provided.

The light shield layer 21 is formed in a frame shape at a position overlapping a data line driver circuit 101, a scanning line driver circuit 102, and an inspection circuit 103 shown in FIG. 1A, in a plan view. The interlayer dielectric 22 is formed of an inorganic material such as silicon oxide that is light-transmissive, and covers the light shield layer 21. The counter electrode 23 is formed of a transparent conductive layer such as ITO, and disposed generally over the entirety of the counter substrate 20. The counter electrode 23 is electrically connected to an interconnect formed on the element substrate 10 through vertical contacts 106 formed at the respective corners of the counter substrate 20 as shown in FIG. 1A.

The alignment layer 18 covering the pixel electrode 15 and the alignment layer 24 covering the counter electrode 23 are obliquely deposited inorganic alignment layers formed of, for example, $SiO_2$, $SiO$, and $MgF_2$. Because of the alignment layers 18 and 24, the liquid crystal layer 50 having negative dielectric anisotropy is generally vertically aligned on the surface of the alignment layers 18 and 24, to thereby perform a normally black display representing a dark display when the pixels are not driven.

On the element substrate 10, a data line driver circuit 101, scanning line driver circuits 102, the inspection circuit 103, and the pixels P are provided.

The data line driver circuit 101 is provided between a side of the element substrate 10 and a portion of the seal member 40 disposed along that side. The inspection circuit 103 is provided inside a portion of the seal member 40 disposed along a side of the element substrate 10 opposite the first mentioned side thereof. Further, the scanning line driver circuits 102 are each provided inside a portion of the seal member 40 disposed along a respective side of the element substrate 10 orthogonal to the first mentioned side and opposing each other. A plurality of interconnects 105 are provided inside the portion of the seal member 40 disposed along the side of the element substrate 10 opposite the first mentioned side, so as to connect the two scanning line driver circuits 102. The data line driver circuit 101 and the interconnects connecting the scanning line driver circuits 102 are connected to a plurality of external connection terminals 104 aligned along the first mentioned side.

Hereafter, the direction along the first mentioned side will be defined as X-direction, the direction along the two sides orthogonal to the first mentioned side and opposing each other will be defined as Y-direction, and the thickness direction of the liquid crystal device 100 will be defined as Z-direction.

As shown in FIG. 1B, the pixels P each include a TFT 30 serving as a switching element, a pixel electrode 15, and a retention capacitance 16. The TFT 30 is a field-effect N-type transistor. In each TFT 30, the gate terminal is connected to a corresponding scanning line 3a, the source terminal is connected to a corresponding data line 6a, and the drain terminal is connected to the pixel electrode 15. As will be subsequently described in details, one of a pair of light-transmissive electrodes constituting the retention capacitance 16 serves as a capacitance line 3b to which a common potential is supplied, and the other is connected to the drain terminal.

The data line 6a is connected to the data line driver circuit 101, so that image signals D1, D2, . . . , Dn provided from the data line driver circuit 101 are provided to the pixels P. The scanning line 3a is connected to the scanning line driver circuit 102, so that scanning signals SC1, SC2, . . . , SCm provided from the scanning line driver circuit 102 are provided to the pixels P.

In the liquid crystal device 100, the image signals D1 to Dn provided from the data line 6a are written in the pixel electrode 15 at the time when the TFT 30 serving as the switching element is turned on for a predetermined period upon receipt of the scanning signals SC1 to SCm. The image signals D1 to Dn of a predetermined level written in the liquid crystal layer 50 through the pixel electrode 15 are retained for a predetermined period between the pixel electrode 15 and the counter electrode 23 located opposite the pixel electrode 15 with the liquid crystal layer 50 therebetween. The retention capacitance 16 is connected in parallel to the liquid crystal capacitance formed between the pixel electrode 15 and the counter electrode 23, so as to suppress leakage of the retained image signals D1 to Dn.

The data line 6a is connected to the inspection circuit 103 shown in FIG. 1A, which enables a malfunction of the liquid crystal device 100 to be detected by detecting the image signals in the manufacturing process of the liquid crystal device 100.

Layer Structure of Element Substrate

Referring now to FIG. 2, a layer structure of the components provided on the element substrate 10, which constitutes an essential part of the invention, will be described. For better understanding of the advantages of this embodiment, only primary components are included in FIG. 2, and other components such as the scanning line 3a, the data line 6a, an underlying insulation layer 10a, a gate insulation layer 11a, and a first interlayer dielectric 12 are excluded.

The retention capacitance 16 and an auxiliary capacitance line 3b1 of a frame shape are provided on the upper side of the TFT 30, the data line driver circuit 101, the scanning line driver circuit 102, and the inspection circuit 103, via a first insulation layer 13. On the upper side of the retention capacitance 16, the pixel electrode 15 and the alignment layer 18 are provided, via the second insulation layer 14. In addition, the TFT 30, the retention capacitance 16, and the pixel electrode 15 are electrically connected to each other on the one-to-one basis.

The region in which the pixel electrodes 15 are disposed corresponds to the pixel region E. The region in which a retention capacitance electrode (first electrode) 16a and the auxiliary capacitance line 3b1 are disposed corresponds to a retention capacitance region S. Here, the lower side of the retention capacitance region S will be defined as S1 and the upper side thereof will be defined as S2, as shown in FIG. 2. The auxiliary capacitance line 3b1 and a capacitance line 3b (not shown) are provided along the outer periphery of the retention capacitance region S, and hence the retention capacitance region S is larger than the pixel region E.

The first insulation layer 13 includes a recessed portion 9, and the retention capacitance 16 is provided on the bottom face 9a of the recessed portion 9 of the first insulation layer 13. Along the periphery of the recessed portion 9 of the first insulation layer 13, the data line driver circuit 101, the scanning line driver circuits 102, and the inspection circuit 103 are provided.

The retention capacitance 16 includes a pair of light-transmissive electrodes and a dielectric layer, the details of which will be subsequently described.

The TFT 30 includes a plurality of layers, the details of which will be subsequently described. The data line driver circuit 101, the scanning line driver circuits 102, and the inspection circuit 103 are formed at a time in the process of forming the TFT 30, and hence have the same layer structure as that of the TFT 30.

Specific Structure of Pixel

Figure 3A:
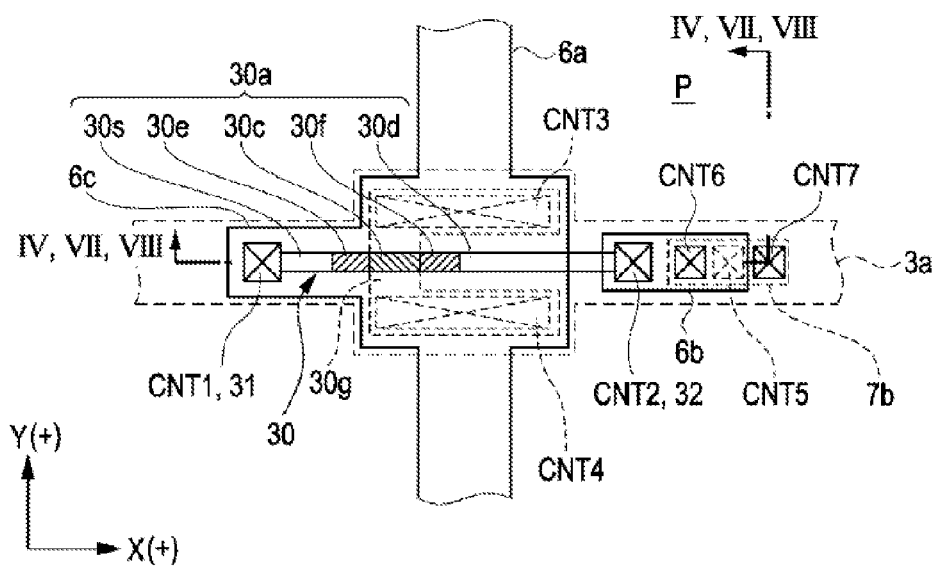
FIGS. 3A and 3B are enlarged plan views showing the pixel in the vicinity of an intersection between a scanning line and a data line, and in the vicinity of a contact between a retention capacitance and a pixel electrode, respectively.
Figure 3B:
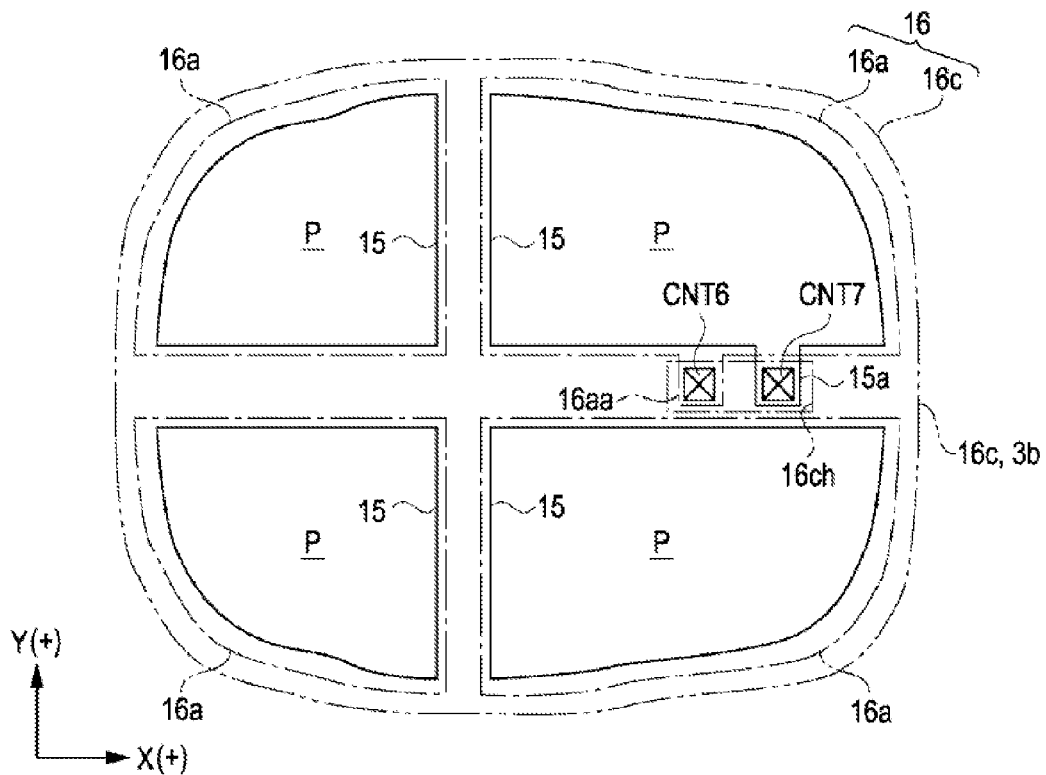
Figure 4:
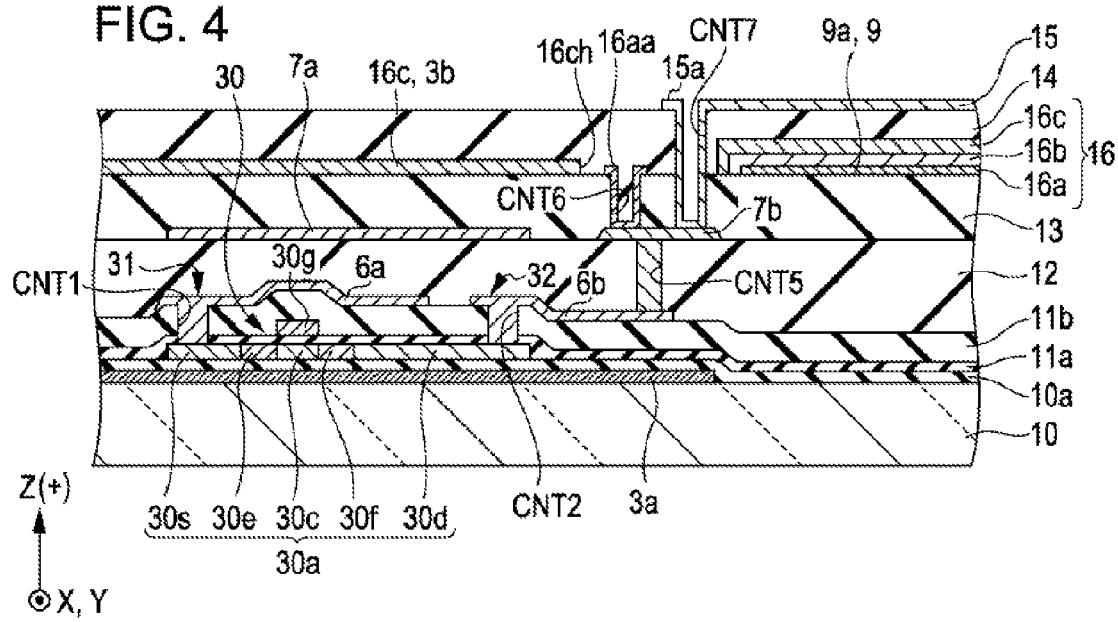
FIG. 4 is a schematic cross-sectional view taken along a line IV-IV in FIG. 3A and showing a structure of the pixel.

Referring to FIGS. 3A, 3B, and 4, the structure of the pixel P will be described in details.

FIGS. 3A and 3B are enlarged plan views showing the pixel in the vicinity of an intersection of the scanning line 3a and the data line 6a, and in the vicinity of the contact between the retention capacitance 16 and the pixel electrode 15, respectively. FIG. 4 is a cross-sectional view of the pixel P taken along a line IV-IV in FIG. 3A.

As shown in FIG. 3A, the pixel P includes the TFT 30 formed in the vicinity of the intersection of the scanning line 3a and the data line 6a. The TFT 30 includes a semiconductor layer 30a of a lightly doped drain (LDD) structure including a data line-side source/drain region 30s, a channel region 30c, a pixel electrode-side source/drain region 30d, a joint region 30e formed between the data line-side source/drain region 30s and the channel region 30c, and a joint region 30f formed between the channel region 30c and the pixel electrode-side source/drain region 30d. The semiconductor layer 30a is disposed through the intersection so as to overlap the scanning line 3a.

The scanning line 3a has an expanded portion of a rectangular shape in a plan view extending in the X- and Y-directions, at the intersection with the data line 6a. The scanning line 3a also includes a gate electrode 30g of a bent shape formed so as to overlap the expanded portion in a plan view and having an opening not overlapping the joint region 30f and the pixel electrode-side source/drain region 30d.

The gate electrode 30g is located such that a portion thereof extending in the Y-direction overlaps the channel region 30c in a plan view. In addition, the portions of the gate electrode 30g respectively bent from the portion overlapping the channel region 30c and extending in the X-direction parallel to each other are each electrically connected to the scanning line 3a through contact holes CNT3 and CNT4 formed between the gate electrode 30g and the expanded portion of the scanning line 3a.

The contact holes CNT3 and CNT4 are of a rectangular shape having the longer sides extending in the X-direction in a plan view, and disposed on the respective sides of the joint region 30f along the channel region 30c and the joint region 30f of the semiconductor layer 30a.

The data line 6a extends in the Y-direction and also includes a rectangular expanded portion formed at the intersection with the scanning line 3a, and is electrically connected to the data line-side source/drain region 30s through a contact hole CNT1 formed in a projecting portion 6c sticking out from the expanded portion in the X-direction. The portion including the contact hole CNT1 serves as a source electrode 31. Likewise, a contact hole CNT2 is provided at an end portion of the pixel electrode-side source/drain region 30d, and the portion including the contact hole CNT2 serves as a drain electrode 32.

Contact holes CNT6, CNT5, and CNT7 are aligned in this order in the direction in which the scanning line 3a extends, i.e., the X-direction, adjacent to the contact hole CNT2. The contact hole CNT2 and the contact hole CNT5 are electrically connected to each other through a first relay electrode 6b formed in an island shape. The contact hole CNT6 and the contact hole CNT7 are electrically connected to each other through a second relay electrode 7b, also formed in an island shape.

As shown in FIG. 3B, the pixel electrodes 15 each include a projection 15a for securing electrical connection with the contact hole CNT7. The pixel electrode 15 is located in a region defined in a rectangular shape by the scanning line 3a extending in the X-direction and the data line 6a extending in the Y-direction, and formed in a generally rectangular island shape.

The retention capacitance 16 includes the first electrode 16a and a second electrode 16c constituting the pair of light-transmissive electrodes, and a dielectric layer 16b interposed between the pair of light-transmissive electrodes.

The first electrode 16a is formed in an island shape so as to overlap the pixel electrode 15 in a plan view. The first electrode 16a includes a projection 16aa for securing electrical connection with the contact hole CNT6. Thus, the first electrode 16a and the pixel electrode 15 are electrically connected to each other through the contact holes CNT6 and CNT7, so that the image signals can be provided.

On the other hand, the second electrode 16c is provided generally over the entirety of the retention capacitance region S, so as to span over the plurality of pixels P arranged in the matrix pattern in the X- and Y-directions. The second electrode 16c includes openings 16ch each corresponding to one of the pixels P, so as not to overlap the contact hole CNT6 to which the first electrode 16a is electrically connected and the contact hole CNT7 to which the pixel electrode 15 is electrically connected. A portion of the second electrode 16c overlapping the first electrode 16a in a plan view serves as a retention capacitance electrode constituting the retention capacitance 16. A portion of the second electrode 16c not overlapping the first electrode 16a in a plan view serves as the capacitance line 3b. A common potential Vcom is supplied to the second electrode 16c through the outer periphery of the retention capacitance region S.

Along the outer periphery of the pixel region E, the second electrode 16c and the frame-shaped auxiliary capacitance line 3b1 (see FIG. 2) are provided. As stated above, the second electrode 16c is formed generally over the entirety of the retention capacitance region S, generally in a rectangular shape. The portion of the second electrode 16c corresponding to the outer periphery of the pixel region E serves as the capacitance line 3b. The auxiliary capacitance line 3b1 is formed in the same process as forming the first electrode 16a, in a frame shape surrounding the outer periphery of the pixel region E. The auxiliary capacitance line 3b1 serves to decrease the resistance of the capacitance line 3b routed along the outer periphery of the pixel region E so as to overlap the second electrode 16c in a plan view, and is electrically connected to the second electrode 16c through a contact hole (not shown) formed in the dielectric layer 16b.

Here, the first electrode 16a exemplifies the "first retention capacitance electrode electrically connected to the pixel electrode" according to the invention. The second electrode 16c exemplifies the "second retention capacitance electrode formed so as to span over the pixel electrodes and to which the common potential is supplied". The dielectric layer 16b exemplifies the "dielectric layer interposed between the first retention capacitance electrode and the second retention capacitance electrode" according to the invention.

Proceeding to FIG. 4, the layer structure of the pixel P will be described in details.

As shown in FIG. 4, the scanning line 3a is first formed on the element substrate 10. The scanning line 3a also serves as a light shield layer that blocks light proceeding toward the semiconductor layer 30a and is formed of a solid metal, an alloy, a metal silicide, a polysilicide, or a nitride composed at least one of Al, Ti, Cr, W, Ta, and Mo, or a layered structure thereof, and may have a light-shielding property.

The underlying insulation layer 10a, for example composed of silicon oxide, is formed so as to cover the scanning line 3a, and the semiconductor layer 30a is formed on the underlying insulation layer 10a in an island shape. The semiconductor layer 30a is formed of, for example, a polycrystalline silicon layer, onto which an impurity ion is implanted so as to form the LDD structure including the data line-side source/drain region 30s, the joint region 30e, the channel region 30c, the joint region 30f, and the pixel electrode-side source/drain region 30d.

Then the first insulation layer (gate insulation layer) 11a, for example composed of silicon oxide, is formed so as to cover the semiconductor layer 30a. Further, the gate electrode 30g is formed so as to oppose the channel region 30c with the first insulation layer 11a therebetween. The gate electrode 30g may be formed of a polycrystalline silicon layer for example, and at the same time the contact holes CNT3 and CNT4 (see FIG. 3A) are formed so as to penetrate through the underlying insulation layer 10a and the first insulation layer 11a, for electrical connection between the scanning line 3a (expanded portion) and the gate electrode 30g.

The second insulation layer 11b, for example formed of silicon oxide, is then formed so as to cover the gate electrode 30g and the first insulation layer 11a. The contact hole CNT1 is formed so as to penetrate through the first insulation layer 11a and the second insulation layer 11b located on the data line-side source/drain region 30s of the semiconductor layer 30a. Likewise, the contact hole CNT2 is formed so as to penetrate through the first insulation layer 11a and the second insulation layer 11b located on the pixel electrode-side source/drain region 30d of the semiconductor layer 30a. Then a conductive layer formed of a light-shielding metal such as Al is deposited so as to cover the second insulation layer 11b and patterned, to thereby form the data line 6a to be electrically connected to the data line-side source/drain region 30s through the contact hole CNT1. At the same time, the first relay electrode 6b, to be electrically connected to the pixel electrode-side source/drain region 30d through the contact hole CNT2, is formed.

The first interlayer dielectric 12 is then formed so as to cover the data line 6a and the first relay electrode 6b. The first interlayer dielectric 12 is for example formed of an oxide, nitride, or oxynitride of silicon, and subjected to a planarization process to flatten the uneven surface formed upon covering the region where the TFT 30 is provided. Specifically, a CMP process is performed for planarization.

The contact hole CNT5 is formed so as to penetrate through the first interlayer dielectric 12 at the position corresponding to the first relay electrode 6b. A conductive layer formed of a light-shielding metal such as Al is deposited so as to cover the contact hole CNT5 and the first interlayer dielectric 12, and the conductive layer is patterned so as to form the interconnect 7a and the second relay electrode 7b to be electrically connected to the first relay electrode 6b through the contact hole CNT5.

The interconnect 7a is formed so as to overlap the semiconductor layer 30a of the TFT 30 and the data line 6a in a plan view, to be given a fixed potential to serve as a shield layer.

Then the second interlayer dielectric 13 is formed so as to cover the interconnect 7a and the second relay electrode 7b. The second interlayer dielectric 13 exemplifies the first insulation layer according to the invention. The second interlayer dielectric 13 may be formed of boron silicate glass (hereinafter, BNSG). The second interlayer dielectric 13 is subjected to a CMP process for planarization.

In the second interlayer dielectric 13 subjected to the planarization, the recessed portion 9 (see FIG. 2) is formed through a dry photo etching process. The recessed portion 9 includes the flat bottom face 9a. The recessed portion 9 exemplifies the "recessed portion formed in the first insulation layer" according to the invention.

On the flat bottom face 9a of the recessed portion 9, the contact hole CNT6 is formed so as to penetrate through the second interlayer dielectric 13 at position corresponding to the second relay electrode 7b. A transparent conductive layer, for example formed of ITO, is deposited so as to cover the contact hole CNT6 and the second interlayer dielectric 13, and the transparent conductive layer is patterned so as to form the first electrode 16a having the projection 16aa. The first electrode 16a is electrically connected to the second relay electrode 7b through the projection 16aa and the contact hole CNT6.

The dielectric layer 16b is deposited on the first electrode 16a, at least in a region opposing the second electrode 16c. The dielectric layer 16b may be formed of alumina ($Al_2O_3$). Alternatively, the dielectric layer 16b may be a monolayer formed of silicon oxide, silicon nitride, hafnium oxide ($HfO_2$), or tantalum oxide ($Ta_2O_5$), or a multilayer including at least two of the cited monolayers. The thickness of the dielectric layer 16b may be 20 nm to 40 nm, from the viewpoint of electrical capacitance. Thus, the dielectric layer 16b is a very thin film and has high visible light transmittance.

A transparent conductive layer, for example formed of ITO, is deposited so as to cover the dielectric layer 16b, and the transparent conductive layer is patterned so as to form the second electrode 16c that serves as the second retention capacitance electrode and the capacitance line 3b. Thus, the first electrode 16a and the second electrode 16c are disposed so as to oppose each other with the dielectric layer 16b interposed therebetween, and the transparent retention capacitance 16 is obtained.

The third interlayer dielectric 14 is formed so as to cover the retention capacitance 16. The third interlayer dielectric 14 exemplifies the second insulation layer according to the invention. The third interlayer dielectric 14 may be a silicon oxide layer. The third interlayer dielectric 14 is subjected to a CMP process for planarization.

Then the contact hole CNT7 is formed so as to penetrate through the second interlayer dielectric 13 and the third interlayer dielectric 14, at the position corresponding to the second relay electrode 7b. A transparent conductive layer, for example formed of ITO, is deposited so as to cover the contact hole CNT7 and the third interlayer dielectric 14, and the transparent conductive layer is patterned so as to form the pixel electrode 15 to be electrically connected to the second relay electrode 7b through the contact hole CNT7.

With the interconnect structure of the element substrate 10 thus arranged, the drain electrode 32 of the TFT 30 is electrically connected to the pixel electrode 15 through the first relay electrode 6b, the contact hole CNT5, the second relay electrode 7b, and the contact hole CNT7. In addition, the drain electrode 32 is electrically connected to the first electrode 16a of the retention capacitance 16, through the first relay electrode 6b, the contact hole CNT5, the second relay electrode 7b, and the contact hole CNT6.

Manufacturing Method of Liquid Crystal Device

Referring now to FIGS. 5A to 8E, a manufacturing process of the element substrate, an essential part of the liquid crystal device according to this embodiment, will be described.

FIGS. 5A to 6E sequentially depict a cross-section of a portion indicated by V, VI in FIG. 2, i.e., a portion of the recessed portion 9 formed under the retention capacitance region S in the vicinity of the sidewall. FIGS. 7A to 8E sequentially depict a cross-section of the pixel P taken along a line VII, VIII-VII, VIII in FIG. 3A. Here, FIGS. 5A to 8E exclude the manufacturing process preceding the formation of the second interlayer dielectric 13 in which known techniques are employed, and represent the manufacturing process subsequent to the formation of the second interlayer dielectric 13, which constitutes an essential part of the invention.

Figure 5A:
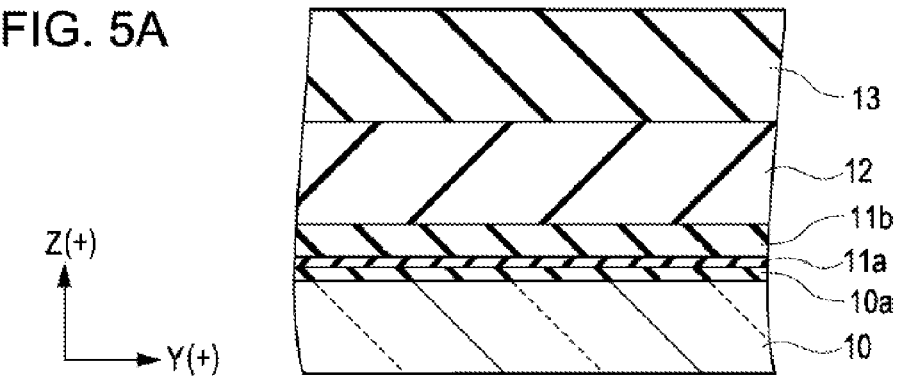
FIGS. 5A and 5B are schematic cross-sectional views for explaining a manufacturing method of a portion indicated by V in FIG. 2.
Figure 7A:
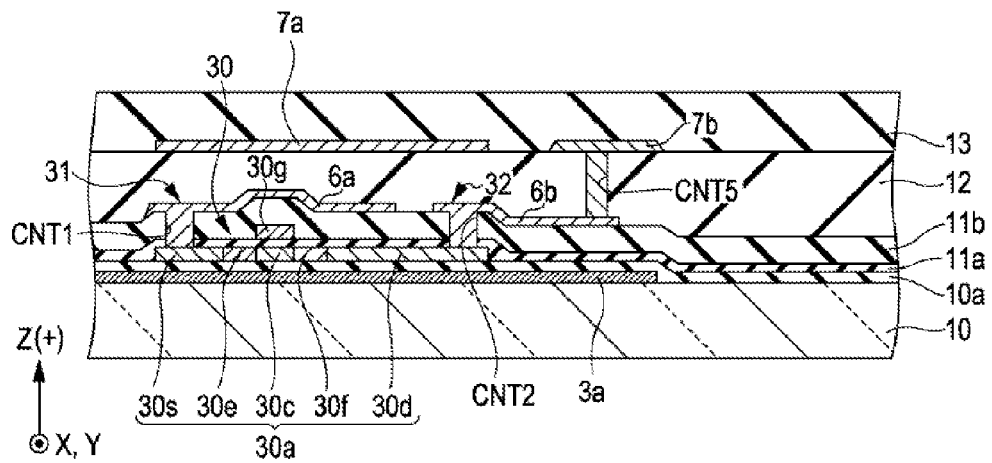
FIGS. 7A and 7B are schematic cross-sectional views taken along a line VII-VII in FIG. 3A, for explaining a manufacturing method of the pixel region.

In the process of forming the second interlayer dielectric 13, the second interlayer dielectric 13 is formed in a desired film thickness through a CMP process for planarization, as shown in FIGS. 5A and 7A.

More specifically, a BNSG layer serving as the precursor of the second interlayer dielectric 13 is formed in a film thickness of approximately 3000 nm to 5000 nm, for example through a normal-pressure or depressurized CVD process that employs tetraethyl borate (TEB) gas. Then the CMP process is performed for planarization to a thickness of approximately 700 nm to 1000 nm, so as to form the second interlayer dielectric 13 having a flat surface.

By the CMP process, a flat polished surface can be quickly obtained, through the collaboration of chemical reaction of the chemical components contained in the polishing solution and the mechanical effect of the relative movement between the abrasive and the element substrate 10. More specifically, in the CMP process, a surface plate with a polishing cloth (pad) made of a nonwoven cloth, foamed polyurethane, or a porous fluoric resin attached thereto and a holder retaining the element substrate 10 are made to relatively rotate in the CMP process for planarization.

The surface of the precursor layer of the second interlayer dielectric 13, formed over the TFT 30, the data line driver circuit 101, the scanning line driver circuit 102, the inspection circuit 103, and the interconnect, is uneven because of the uneven surface shape of those underlying components. As stated above, in the case where the precursor layer is formed as a thick film and a large polish-away amount is set for the CMP process, the unevenness of the precursor layer is removed and the second interlayer dielectric 13 having a flat surface can be obtained.

Figure 5B:
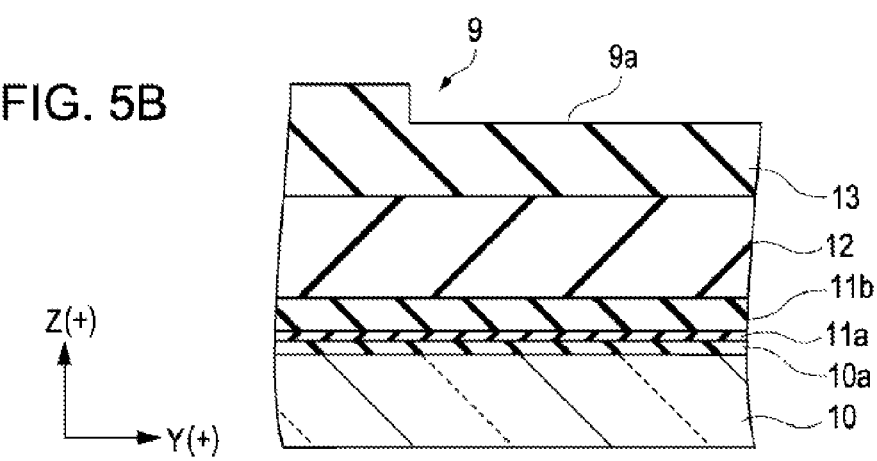
Figure 7B:
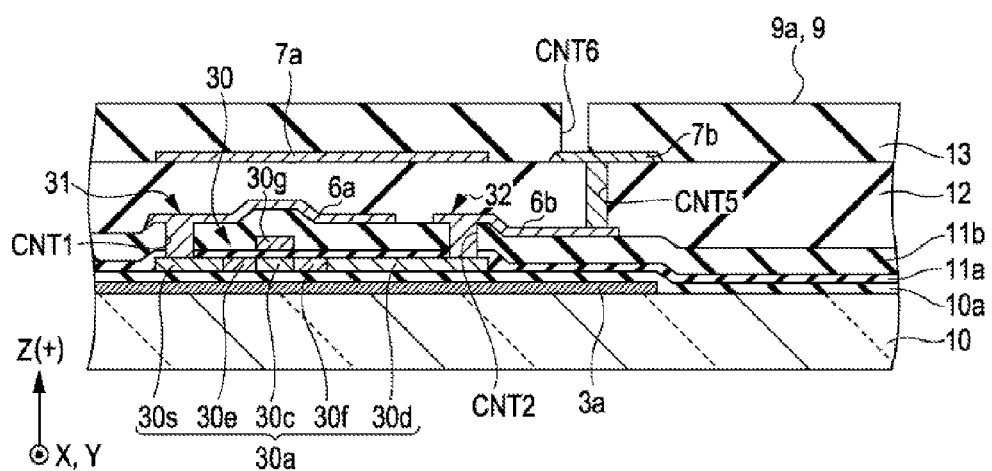

In the process of forming the recessed portion 9, the recessed portion 9 having the flat bottom face 9a is formed in the second interlayer dielectric 13, over a region larger than the retention capacitance region S, as shown in FIGS. 5B and 7B.

The recessed portion 9 may be formed through an etching process on the second interlayer dielectric 13, utilizing a resist formed by photo lithography as the mask and a CF-based gas such as $CF_4$, $C_2F_6$. The thickness to be reduced by etching, in other words the depth of the recessed portion 9 is approximately 200 nm to 400 nm.

It is preferable to make the bottom face 9a of the recessed portion 9 as flat as possible, because if the bottom face 9a of the recessed portion 9 is unevenly formed by etching, the film thickness of the third interlayer dielectric 14 formed on the bottom face 9a becomes ununiform, which may result in an uneven display and fluctuation of color tone. In other words, it is preferable to uniformly reduce the thickness of the second interlayer dielectric 13 by etching so as to form the flat bottom face 9a. For this purpose, it is preferable to employ an anisotropic dry etching process such as reactive ion etching and reactive ion beam etching, to form the recessed portion 9. For example wet etching, and isotropic dry etching in which the etching gas is non-directionally supplied are not desirable because sufficient flatness of the etched surface cannot be secured through those methods.

It is also preferable to completely remove the resist from the region to be etched, because the residual resist on the film to be removed by etching leaves that region unetched, thereby significantly degrading the flatness of the bottom face 9a of the recessed portion 9. Accordingly, it is preferable to appropriately control the photo lithography conditions so as not to produce the residual resist. For example, a descum process utilizing $O_2$ plasma or an additional development process may be performed, to ensure that the resist is completely removed.

After forming the recessed portion 9, the contact hole CNT6 shown in FIG. 7B is formed in the second interlayer dielectric 13, by a known technique.

In the process of forming the retention capacitance, the retention capacitance 16 is formed on the flat bottom face 9a of the recessed portion 9, as shown in FIGS. 6C and 8C.

As shown in FIG. 8C, the pixel region E includes the first electrode 16a formed of ITO by sputtering in a film thickness of 100 nm to 200 nm, the dielectric layer 16b formed of alumina in a film thickness of 20 nm to 40 nm, and the second electrode 16c formed of ITO by sputtering in a film thickness of 100 nm to 200 nm, stacked in the mentioned sequence, which constitute the retention capacitance 16. The dielectric layer 16b covers the end face of the first electrode 16a and the second electrode 16c covers the end face of the dielectric layer 16b, so that the retention capacitance 16 is formed on the end face of the first electrode 16a. Here, the total of the film thicknesses of the first electrode 16a, the second electrode 16c, and the dielectric layer 16b correspond to the thickness of the retention capacitance 16. The thickness of the retention capacitance 16 may be approximately 200 nm to 400 nm.

It is preferable to form the retention capacitance 16 in a thickness that is generally the same as the depth of the recessed portion 9, because what is important is to minimize unevenness that may affect the surface shape of the precursor layer 14a of the third interlayer dielectric 14 to be formed in the next process, especially the widely formed projections in the retention capacitance region S which are the cause of the global step.

As shown in FIG. 6C, the auxiliary capacitance line 3b1, the dielectric layer 16b, and the second electrode 16c serving as the capacitance line 3b are stacked in this order on the bottom face 9a of the recessed portion 9. The dielectric layer 16b covers the end face of the first electrode 16a, and the second electrode 16c covers the end face of the dielectric layer 16b.

The dielectric layer 16b is patterned by a known dry etching technique. In the case where, for example, the dielectric layer 16b and the second interlayer dielectric 13 are formed of the same material, when the dielectric layer 16b is formed by the etching process the second interlayer dielectric 13 is also partly removed by the etching process. Accordingly, it is necessary to cover the bottom face 9a of the recessed portion 9, the sidewall thereof, as well as the periphery thereof with the dielectric layer 16b.

In this embodiment also, the dielectric layer 16b may be formed over a larger area than the first electrode 16a, so as to cover the bottom face 9a of the recessed portion 9, the sidewall thereof, as well as the periphery thereof with the dielectric layer 16b.

In the process of forming the third interlayer dielectric, the precursor layer 14a, serving as the precursor of the third interlayer dielectric 14 is first formed as shown in FIGS. 6D and 8D. The precursor layer 14a may be formed of silicon oxide, in a film thickness of approximately 700 nm to 1000 nm through a normal-pressure or depressurized CVD process utilizing tetraethyl orthosilicate (TEOS) gas.

As shown in FIG. 6D, a recess having a depth d1 is formed in the precursor layer 14a at a position corresponding to between the sidewall of the recessed portion 9 and the end face of the retention capacitance 16, because of the shape of the underlying structure. The depth d1 is generally the same as the thickness of the retention capacitance 16 (or the depth of the recessed portion 9), which is approximately 200 nm to 400 nm. Thus, a frame-shaped recess, having a depth of approximately 200 nm to 400 nm and a width corresponding to the distance between the sidewall of the recessed portion 9 and the end face of the retention capacitance 16, is formed along the outer periphery of the retention capacitance region S.

It is preferable that the area of the frame-shaped recess, in other words the distance between the sidewall of the recessed portion 9 and the end face of the retention capacitance 16 is made as small as possible.

As shown in FIG. 8D, recesses having a maximum depth d1 are regularly formed in the precursor layer 14a so as to correspond to each of the pixels P in the pixel region E, at the respective positions corresponding to between the opening 16ch of the second electrode 16c and the end portion of the first electrode 16a, because of the shape of the underlying structure. The recesses regularly formed so as to correspond to each of the pixels P will hereafter be referred to as local steps.

As described above, the frame-shaped recess along the outer periphery of the retention capacitance region S and the recesses regularly corresponding to each of the pixels P (local steps) are formed in the precursor layer 14a according to this embodiment.

Proceeding to FIGS. 6E and 8E, the precursor layer 14a is subjected to a CMP process for planarization, so as to form the third interlayer dielectric 14 in a desired film thickness. In the third interlayer dielectric 14 of the pixel P, as shown in FIG. 8E, ITO is deposited in a film thickness of 100 nm to 200 nm by sputtering after forming the contact hole CNT7 by a known technique, and the ITO is patterned by a known technique so as to form the pixel electrode 15 covering the contact hole CNT7.

Light is reflected, more specifically multiply reflected, at an interface between materials having different refractive indices, such as the interface between the third interlayer dielectric 14 and the pixel electrode 15, and the interface between the third interlayer dielectric 14 and the second electrode 16c. The multiple interference of such reflected light provokes fluctuation in intensity of the light transmitted through the third interlayer dielectric 14. Accordingly, the ununiformity of the film thickness of the third interlayer dielectric 14 provokes fluctuation in intensity of the light outputted from the liquid crystal device 100. For example, ununiformity of the film thickness of the third interlayer dielectric 14 in the same panel leads to an uneven display, and ununiformity of the film thickness of the third interlayer dielectric 14 among different panels lead to uneven color tone of the displayed images. Therefore, it is preferable to control the film thickness of the third interlayer dielectric 14 to a desired level.

In the process of forming the second interlayer dielectric 13 shown in FIGS. 5A and 7A, the precursor layer is thickly formed and subjected to the CMP process of a large polish-away amount, so as to form the second interlayer dielectric 13 having a flat surface. However, since the CMP process includes a mechanical polishing aspect, it is inevitable that the polish-away amount mechanically fluctuates, and hence it is difficult to control the film thickness to a desired level by thickly forming the precursor layer and polishing away a large amount in the CMP process. Therefore, the precursor layer 14a of the third interlayer dielectric 14 is formed in a thinner film thickness than the precursor layer of the second interlayer dielectric, and subjected to the CMP process of a smaller polish-away amount, so as to form the third interlayer dielectric 14 having the desired film thickness.

The etching process, in which the film thickness is chemically reduced, is more advantageous for controlling the thickness-reduction amount with high accuracy, than the CMP process in which the film thickness is mechanical reduced (polished). Accordingly, the film thickness can be accurately controlled to the desired level by first polishing the precursor layer 14a to a certain extent and then adjusting the thickness-reduction amount in the etching process. Thus, it is preferable, for the planarization of the precursor layer 14a, to first remove the unevenness of the surface of the precursor layer 14a by the CMP process, and to perform the etching on the polished surface under controlled conditions, so as to attain the desired film thickness.

An example of the etching method is soaking the material in hydrogen fluoride (HF) for a predetermined time. Alternatively, a dry etching process such as reactive ion etching or reactive ion beam etching may be employed for obtaining the desired film thickness. An additional advantage of the etching process is that micro scratches originating from the CMP process are minimized and hence a smoother surface can be obtained.

Flatness of Interlayer Dielectric

Figure 9A:
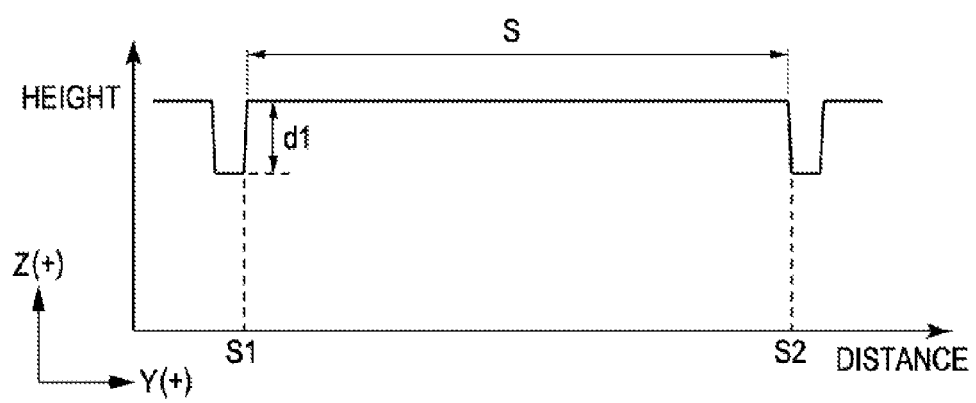
FIGS. 9A and 9B are graphs showing surface shapes of an interlayer dielectric.
Figure 9B:
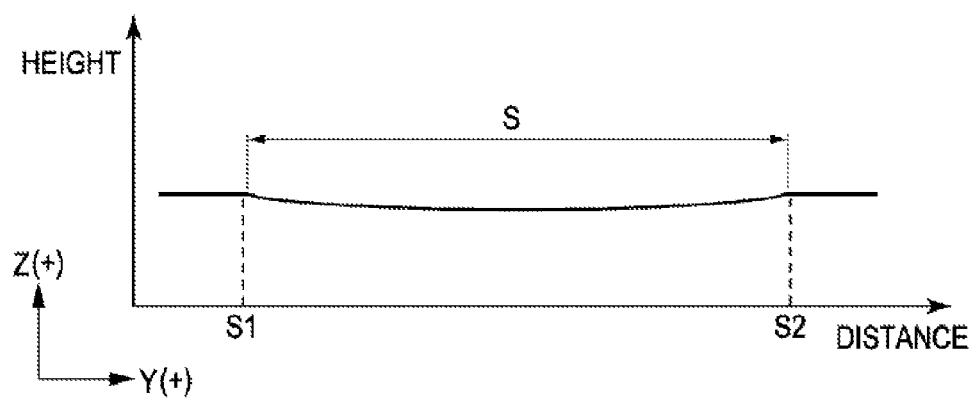

Referring now to FIGS. 9A and 9B, the flatness of the third interlayer dielectric 14 according to this embodiment will be described.

FIG. 9A depicts the surface shape before the planarization, and FIG. 9B depicts the surface shape after the planarization. The horizontal axis represents the distance in the Y-direction, and the vertical axis represents the height in the Z-direction.

As shown in FIG. 9A, the precursor layer 14a before the planarization includes the recess having the depth d1 (approximately 200 nm to 400 nm) at the respective end portions of the retention capacitance region S, i.e., at S1 (under the retention capacitance region S) and S2 (above the retention capacitance region S) on the horizontal axis. Since the depth of the recessed portion 9 and the thickness of the retention capacitance 16 are generally the same, it is understood that the widely formed projections which are the cause of the global step are not formed in the retention capacitance region S.

Here, the recesses regularly formed so as to correspond to each of the pixels P (local steps) are not shown in FIG. 9A.

As shown in FIG. 9B, the recess in the retention capacitance region S is removed by the CMP process for planarization, and a generally flat surface is formed. More precisely, the surface of the retention capacitance region S assumes a concave shape of a mild inclination in which a central portion (vicinity of the center of the pixel region E) is slightly recessed. The difference in height in the retention capacitance region is not larger than approximately 50 nm.

Accordingly, it is understood that the difference in height of approximately 200 nm to 400 nm is reduced to a difference not larger than approximately 50 nm by the planarization applied to the precursor layer 14a.

Presumably, the concave surface of a mild inclination formed in the pixel region E originates from the local steps of the pixel region E.

In the CMP process, generally, the polishing speed becomes faster on an uneven surface and slower on a flatter surface. In the CMP process according to this embodiment also, the polishing proceeds faster in the pixel region E where the local steps are present, and slower in the peripheral region where the local step is not present. In addition, the polishing proceeds slower in the outer periphery of the pixel region E than in the vicinity of the center thereof, owing to an influence of the peripheral region where the local step is not present. The influence of the peripheral region becomes greater in a region closer to the outer periphery of the pixel region E, making the polishing speed gradually slower. Thus, it is presumed that such uneven polishing speed in the pixel region E is the cause of the concave shape of a mild inclination formed on the polished surface of the pixel region E.

However, the cause of the concave shape of a mild inclination in the pixel region E does not affect the alignment of the liquid crystal molecules, and hence a uniform display can be secured over the entirety of the pixel region E. Further, since the global step is not present along the outer periphery of the pixel region E, unevenness of the display is suppressed in the outer periphery of the pixel region E, so that a high-quality display can be achieved.

Thus, the liquid crystal device 100 according to this embodiment provides the following advantageous effects.

(1) The recessed portion 9 having the flat bottom face 9a is formed on the second interlayer dielectric 13 and the retention capacitance 16 is formed on the flat bottom face 9a of the recessed portion, such that the depth of the recessed portion 9 and the thickness of the retention capacitance 16 become generally the same. With such a configuration, the widely formed projections in the retention capacitance region S, which are the cause of the global step, are removed in the third interlayer dielectric 14.

More specifically, in the precursor layer 14a of the third interlayer dielectric 14 formed so as to cover the second interlayer dielectric 13 and the retention capacitance 16, the widely formed projections reflecting the shape of the underlying retention capacitance 16, which are the cause of the global step, become lower. Accordingly, the precursor layer 14a can be formed into the third interlayer dielectric 14 having a flat surface free from the global step, despite performing the CMP process of a small polish-away amount. Further, since the film thickness is only slightly reduced by the CMP process, the third interlayer dielectric 14 can be accurately formed in a desired film thickness.

Therefore, an uneven display originating from the global step, as well as an uneven display and fluctuation of color tone originating from the ununiform film thickness of the third interlayer dielectric 14 can be suppressed, and thus the liquid crystal device 100 that provides a high-quality display can be obtained.

(2) By employing the anisotropic dry etching for processing the second interlayer dielectric 13, the bottom face 9a of the recessed portion 9 can be made flatter. The retention capacitance 16 formed on the flatter bottom face 9a, and the precursor layer 14a of the third interlayer dielectric 14 formed on the retention capacitance 16 also gain a flatter surface. Applying the planarization process to the flatly formed precursor layer 14a leads to formation of the third interlayer dielectric 14 having a flatter surface and a more uniform film thickness.

Therefore, an uneven display originating from the uneven surface shape and ununiform film thickness of the third interlayer dielectric 14 can be suppressed, and thus the liquid crystal device 100 that provides a high-quality display can be obtained.

(3) By first performing the CMP process and then etching the polished surface for planarization of the precursor layer 14a of the third interlayer dielectric 14, micro scratches originating from the polishing process are minimized and hence the third interlayer dielectric 14 can be formed with a smoother surface. In addition, the final film thickness can be adjusted in the etching process, and therefore the third interlayer dielectric 14 can be formed in a desired film thickness with higher accuracy.

Therefore, an uneven display and fluctuation of color tone originating from the ununiform film thickness of the third interlayer dielectric 14 can be suppressed, and thus the liquid crystal device 100 that provides a high-quality display can be obtained.

Electronic Apparatus

Figure 10:
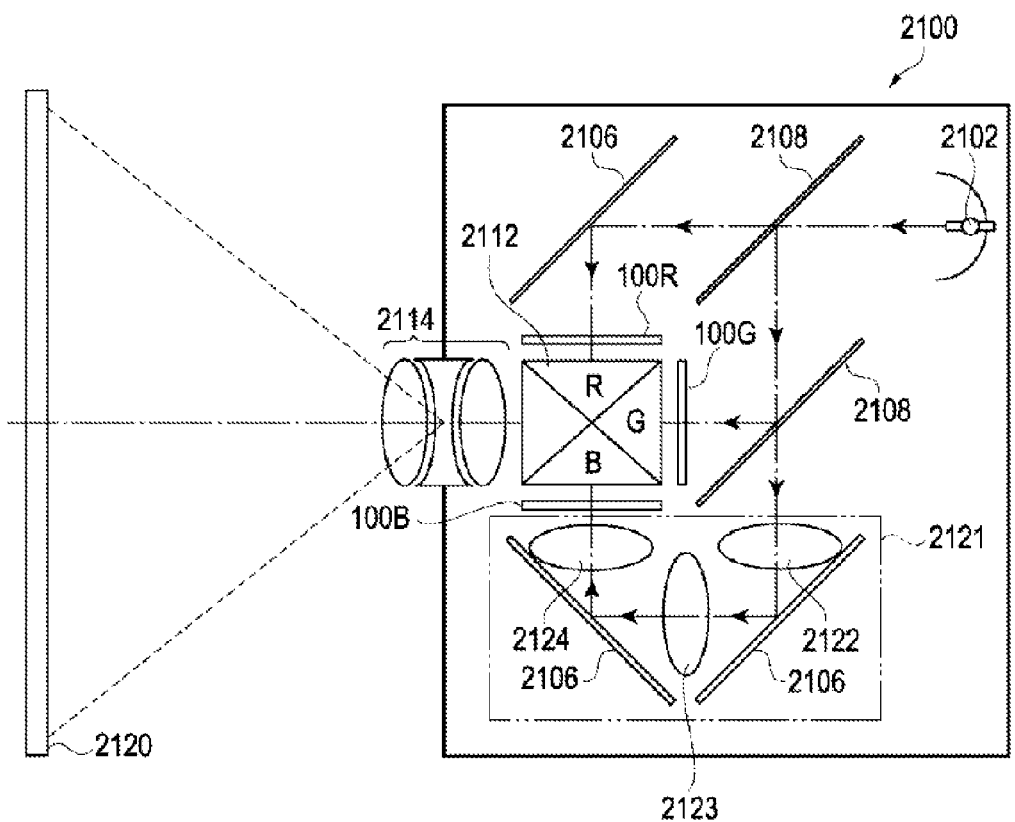
FIG. 10 is a schematic plan view of a projector exemplifying an electronic apparatus.

Referring to FIG. 10, an example of the electronic apparatus that includes the liquid crystal device according to this embodiment, which exemplifies the electro-optical apparatus, will be described hereunder. FIG. 10 is a schematic plan view of a three-plate projector exemplifying the electronic apparatus.

In the projector 2100, light outputted from a light source 2102, constituted of a ultra-high pressure mercury lamp, is split into three primary colors of red (R), green (G), and blue (B) by three mirrors 2106 and two dichroic mirrors 2108 mounted inside the projector 2100, and incident into a dichroic prism 2112 guided by light bulbs 100R, 100G, and 100B respectively corresponding to one of the primary colors. Here, since the light beam of B travels a longer optical path than the light beams of R and G, a relay lens system 2121 including an incident lens 2122, a relay lens 2123, and an output lens 2124 is provided so as to minimize attenuation.

The light bulbs 100R, 100G, and 100B are each configured as the liquid crystal device 100 according to the foregoing embodiment, and driven on the basis of image data corresponding to R, G, and B colors supplied by an external superordinate apparatus (not shown).

The light beams respectively modulated by the light bulbs 100R, 100G, and 100B are incident into the dichroic prism 2112 from three directions. In the dichroic prism 2112, the light beams of R and B are refracted in 90 degrees and the light beam of G proceeds linearly. The light representing a color image synthesized in the dichroic prism 2112 is enlarged and projected through a lens unit 2114, so that a full color image is displayed on a screen 2120.

Here, the image transmitted through the light bulbs 100R, 100B are reflected by the dichroic prism 2112 before being projected, while the image transmitted through the light bulb 100G is linearly projected. Accordingly, the projector 2100 is configured such that the images formed by the light bulbs 100R, 100B are horizontally inverted with respect to the image formed by the light bulb 100G.

The projector 2100 exemplifying the electronic apparatus according to this embodiment includes the liquid crystal devices 100 according to the foregoing embodiment each constituting the light bulb 100R, 100G, and 100B, and is therefore capable of projecting bright and high-quality full color images.

The electronic apparatus can be exemplified, in addition to the projector shown in FIG. 10, by a rear-projection TV, a direct-view TV, a mobile phone, a portable audio apparatus, a personal computer, a video camera monitor, a car navigation system, a pager, an electronic organizer, a pocket calculator, a word processor, a work station, a TV phone, a POS terminal, a digital still camera, and so forth. The liquid crystal device 100 can also be applied to any of the electronic apparatuses cited above.

The invention is in no way limited to the foregoing embodiment, but various modifications may be made. A few variations will be described here below.

Variation 1

According to the foregoing embodiment, the plurality of first retention capacitance electrodes 16a to which image signals are provided and the second retention capacitance electrode 16c to which a common potential is supplied are formed on the flat bottom face 9a of the recessed portion 9 formed on the second interlayer dielectric 13 by anisotropic dry etching.

In the interval between one of the first retention capacitance electrodes 16a and another one adjacent thereto, in other words in the region where the first retention capacitance electrode 16a is not located, the recessed portion is formed in the depth corresponding to the thickness of the first retention capacitance electrode 16a. In addition, in the opening 16ch formed in the second retention capacitance electrode 16c so as to correspond to each of the pixels P, in other words in the region where the second retention capacitance electrode 16c is not located, the recessed portion is formed in the depth corresponding to the thickness of the second retention capacitance electrode 16c.

Protruding portions may be formed on the bottom of the recessed portions formed upon forming the first retention capacitance electrode 16a and the second retention capacitance electrode 16c, so as to minimize the depth of the recessed portions. In other words, partially protruding portions may be formed on the flat bottom face 9a of the recessed portion 9 formed on the second interlayer dielectric 13 by anisotropic dry etching. Such protruding portions may be formed through the following process.

(1) A first anisotropic dry etching process is performed on a region of the second interlayer dielectric 13 where the recessed portion 9 is to be formed, such that the target region is etched to the depth corresponding to the total film thickness of the first retention capacitance electrode 16a and the dielectric layer 16b.

(2) The regions where the first retention capacitance electrode 16a is not located and where the second retention capacitance electrode 16c is not located are covered with a resist, to thereby keep such regions from being further etched. Then a second anisotropic dry etching process is performed on the regions of the second interlayer dielectric 13 where the first retention capacitance electrode 16a is located and where the second retention capacitance electrode 16c is located, such that the target regions are etched to the depth corresponding to the film thickness of the second retention capacitance electrode 16c.

The second interlayer dielectric 13 thus formed includes the recessed portion 9 having the depth corresponding to the thickness of the retention capacitance 16, in other words the total film thickness of the first retention capacitance electrode 16a, the second retention capacitance electrode 16c, and the dielectric layer 16b. Further, protruding portions having the height corresponding to the film thickness of the second retention capacitance electrode 16c are formed on the regions of the bottom face 9a of the recessed portion 9 where the first retention capacitance electrode 16a is not located and where the second retention capacitance electrode 16c is not located.

In the electro-optical apparatus thus configured, the depth of the recessed portions (local steps) formed in the regions where the first retention capacitance electrode 16a is not located and where the second retention capacitance electrode 16c is not located is reduced by the protruding portions formed on the bottom of the recessed portions. Thus the local steps in the pixel region E become lower, which suppresses the fluctuation of the polishing speed in the CMP process in the pixel region E.

Consequently, the polishing proceeds at a uniform speed in the pixel region E, which leads to higher uniformity of the film thickness and surface flatness of the second interlayer dielectric 13 in the pixel region E.

The depths of the recessed portions originating from the formation of the retention capacitance 16 are not uniform, but the recessed portions formed in the pixel region E have different depths. It would be best to form the protruding portions on the bottom of the respective recessed portions, in different heights in accordance with the depth of the corresponding recessed portion. Alternatively, however, forming the protruding portions that minimize the depth of one or more recessed portions occupying a relatively larger area among the recessed portions having the different depths allows the polishing process to be performed at a uniform speed in the pixel region E, to thereby obtain a flatter surface.

In other words, forming the protruding portions on the bottom of the recessed portions formed upon forming the retention capacitance 16 so as to reduce the depth of the recessed portion to a certain extent allows the polishing process to be performed at a uniform speed in the pixel region E, to thereby obtain a flatter surface.

Variation 2

The foregoing embodiment and the variation 1 exemplify the transmissive type electro-optical apparatus in which the pixel electrode 15 is formed of a light-transmissive material such as ITO. Alternatively, a highly reflective material such as Al or Ag may be employed to form the pixel electrode 15, thus to constitute a reflective type electro-optical apparatus.

In the reflective type electro-optical apparatus configured as above also, the global step can be minimized and the interlayer dielectric having a flat surface can be obtained, and therefore an uneven display owing to the global step can be suppressed and a high-quality display can be realized.

Variation 3

The configuration of the retention capacitance 16 is not limited to the foregoing embodiment.

For example, the second retention capacitance electrode 16c to which a common potential is supplied may be formed first, before forming the dielectric layer 16b and the first retention capacitance electrode 16a to which image signals are provided.

In the electro-optical apparatus thus configured the second retention capacitance electrode 16c to which a common potential is supplied is located at a lower position, and therefore a parasitic capacitance between the second retention capacitance electrode 16c and the pixel electrode 15 can be minimized.

The entire disclosure of Japanese Patent Application No. 2011-212183, filed Sep. 28, 2011 is expressly incorporated by reference herein.

What is claimed is:
1. An electro-optical apparatus, comprising:
a first insulation layer;
a retention capacitance region that is a region where a plurality of retention capacitances are disposed on the first insulation layer, each of the plurality of retention capacitances comprising a first electrode, a second electrode, and a dielectric layer interposed between the first electrode and the second electrode;
a second insulation layer disposed so as to cover the first insulation layer and the plurality of retention capacitances; and
a plurality of pixel electrodes arranged on the second insulation layer, one of the plurality of pixel electrodes overlapping one of the plurality of retention capacitances in plan view,
wherein
the first insulation layer has a recessed portion that includes the retention capacitance region,
the plurality of retention capacitances are provided on a bottom face of the recessed portion, and
the first electrode, the second electrode, and the dielectric layer of each of the plurality of retention capacitances are arranged adjacent to a first side of the second insulation layer and the plurality of pixel electrodes are arranged adjacent to a second side of the second insulation layer, the second side being opposite to the first side.
2. The electro-optical apparatus according to claim 1, wherein a depth of the recessed portion and a thickness of the plurality of retention capacitances are approximately equal.
3. The electro-optical apparatus according to claim 1, wherein, for each of the plurality of retention capacitances:
the first electrode is electrically connected to one of the plurality of pixel electrodes; and
the second electrode is disposed so as to span over the plurality of pixel electrodes, a common potential being supplied to the second retention capacitance electrode.

4. The electro-optical apparatus according to claim 3, wherein a protruding portion is disposed on the bottom face of the recessed portion and in at least one of a region where the first electrode is not located and a region where the second electrode is not located.

5. The electro-optical apparatus according to claim 1, wherein each of the plurality of the retention capacitances includes a first light transmissive material, and each of the plurality of the pixel electrodes includes a second light transmissive material.

6. The electro-optical apparatus according to claim 1, wherein each of the plurality of pixel electrodes includes a light reflective material.

7. An electronic apparatus, comprising the electro-optical apparatus according to claim 1.

8. An electronic apparatus, comprising the electro-optical apparatus according to claim 2.

9. An electronic apparatus, comprising the electro-optical apparatus according to claim 3.

10. An electronic apparatus, comprising the electro-optical apparatus according to claim 4.

11. An electronic apparatus, comprising the electro-optical apparatus according to claim 5.

12. An electronic apparatus, comprising the electro-optical apparatus according to claim 6.

* * * * *